(12) United States Patent
Kadam et al.

(10) Patent No.: US 11,960,851 B2
(45) Date of Patent: Apr. 16, 2024

(54) SYSTEMS AND METHODS FOR IMPROVING COMPREHENSION IN TRANSLATION BASED ON CONTEXT-BASED REFERENCES

(71) Applicant: Rovi Guides, Inc., San Jose, CA (US)

(72) Inventors: Lakhan Tanaji Kadam, Maharashtra (IN); Srishti Sharma, Bihar (IN)

(73) Assignee: Rovi Guides, Inc., San Jose, CA (US)

( * ) Notice: Subject to any disclaimer, the term of this patent is extended or adjusted under 35 U.S.C. 154(b) by 52 days.

(21) Appl. No.: 17/036,696

(22) Filed: Sep. 29, 2020

(65) Prior Publication Data

US 2022/0100970 A1 Mar. 31, 2022

(51) Int. Cl.
*G06F 40/58* (2020.01)
*G06F 40/166* (2020.01)
*G06F 40/295* (2020.01)
*G06F 40/30* (2020.01)

(52) U.S. Cl.
CPC ............ *G06F 40/58* (2020.01); *G06F 40/166* (2020.01); *G06F 40/295* (2020.01); *G06F 40/30* (2020.01)

(58) Field of Classification Search
None
See application file for complete search history.

(56) References Cited

U.S. PATENT DOCUMENTS 10,063,910 B1 8/2018 Yelton et al.
2020/0285636 A1* 9/2020 Liu ....................... G06F 40/263

\* cited by examiner

*Primary Examiner* — Quynh H Nguyen
(74) *Attorney, Agent, or Firm* — HALEY GUILIANO LLP

(57) ABSTRACT

Methods and systems are disclosed herein for a context assistance system converting a reference in a content item based on context associated with the content item. For example, the context assistance system identifies a first entity referenced in the content item associated with a first context. The context assistance system then determines at least one attribute of the first entity. Next, the context assistance system identifies a second context in which the content item is to be presented. The context assistance system determines the second entity based on the second context and on the at least one attribute of the first entity. The context assistance system replaces reference to the first entity in the content item with reference to the second entity.

18 Claims, 5 Drawing Sheets

SYSTEMS AND METHODS FOR IMPROVING COMPREHENSION IN TRANSLATION BASED ON CONTEXT-BASED REFERENCES

BACKGROUND

With advanced translation techniques, content is translated into multiple languages and become available in many countries. When content written in a source language is translated, most of its text is translated into a target language. However, because of their uniqueness, references to certain subjects, such as unique names or places, do not get translated, and when translated, they are translated phonetically. As a result, the true meaning of those references may get lost when translated as the references often contain a cultural or linguistic context of the source language.

SUMMARY

The present disclosure addresses the problems described above, by, for example, providing systems and methods for converting context-based references in a content item to enhance comprehension of a translated content item. For example, when a user requests an English version of a book to be translated into the Hindi language, a certain reference that is made in the English version that is more common in the English context is replaced with an equivalent Indian reference that is associated with a similar meaning and characteristic. Accordingly, the systems and method described herein provide a clearer content item consumption experience with relevant information that reduces the time a user may otherwise be searching for context instead of consuming a content item.

Systems and methods are described herein for a context assistance system that converts context-based references in content items. In some embodiments, the context assistance system identifies a first entity (e.g., a Scottish reference) referenced in a content item (e.g., electronic book) associated with a first context (e.g., Scottish culture or English language). The context assistance system may determine an attribute of the entity (e.g., characteristic or feature). From a user profile or a user request, the context assistance system identifies a second context in which the content item is to be presented (e.g., a request to translate the content item in the Hindi language). A second entity (e.g., Hindi reference) is determined based on the second context (e.g., Indian culture) and on the attribute of the first entity (e.g., characteristics of the Scottish reference). The context assistance system replaces reference to the first entity in the content item with reference to the second entity in the translated content item, resulting in a Hindi version of the electronic book to be presented with the Hindi references instead of the Scottish references.

In some embodiments, the context assistance system accesses a knowledge graph to identify the second entity that shares similar characteristics to the first entity. The knowledge graph may include information about a plurality of entities and corresponding respective attribute information. An entity may be associated with one or more attributes (e.g., features) that characterize the entity. The knowledge graph may include attribute information for many different types of contexts, including different countries, languages, cultures, or locations. For example, a South African reference for South African users who speak English may be converted to an Australian reference for Australian users who also speak English as an official language. An entity referenced in a content item for the South African users may be converted to an entity that is more common and well known to the Australian users based on the cultural context even though the original language of the content item is not translated into a different language.

Based on the attribute information stored in the knowledge graph, a plurality of candidates for the second entity may be identified. For each candidate, a respective similarity score is calculated. In some embodiments, a similarity score is calculated based on comparing at least one attribute of the first entity to a corresponding attribute of a candidate entity. For example, a location type entity "Niagara Falls," which may include an attribute "waterfalls," may be compared to another location entity that includes the attribute "waterfalls," such as "Yosemite Falls." Based on the comparison, a similarity score is calculated to determine the best matching second entity that is the most similar to the first entity.

In some embodiments, the context assistance system determines a weight associated with each attribute. For each attribute of an entity, a respective weight is determined to better calculate a similarity score. A respective weight indicates an association level of a respective attribute with an entity based on the entity information. The higher the respective weight is, the more an entity is associated with a corresponding attribute than other attributes of the entity. For example, an attribute "waterfalls" is more likely to be associated with an entity "Niagara Falls" than an attribute "snowy mountain," and thus, the attribute "waterfalls" is likely to have a higher weight than the attribute "snowy mountain."

In some embodiments, the context assistance system uses a popularity score to calculate a similarity score. A popularity score indicates a popularity level of an entity based on the entity information. The more popular an entity is in a certain context, the more likely the users will recognize a converted entity in the content item. For example, a well-known touristic spot, "Niagara Falls," is likely to have a higher popularity score in the US than some other generally less well-known waterfalls.

It should be noted that the systems, methods, apparatuses, and/or aspects described above may be applied to, or used in accordance with, other systems, methods, apparatuses, and/or aspects described in this disclosure.

BEST DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
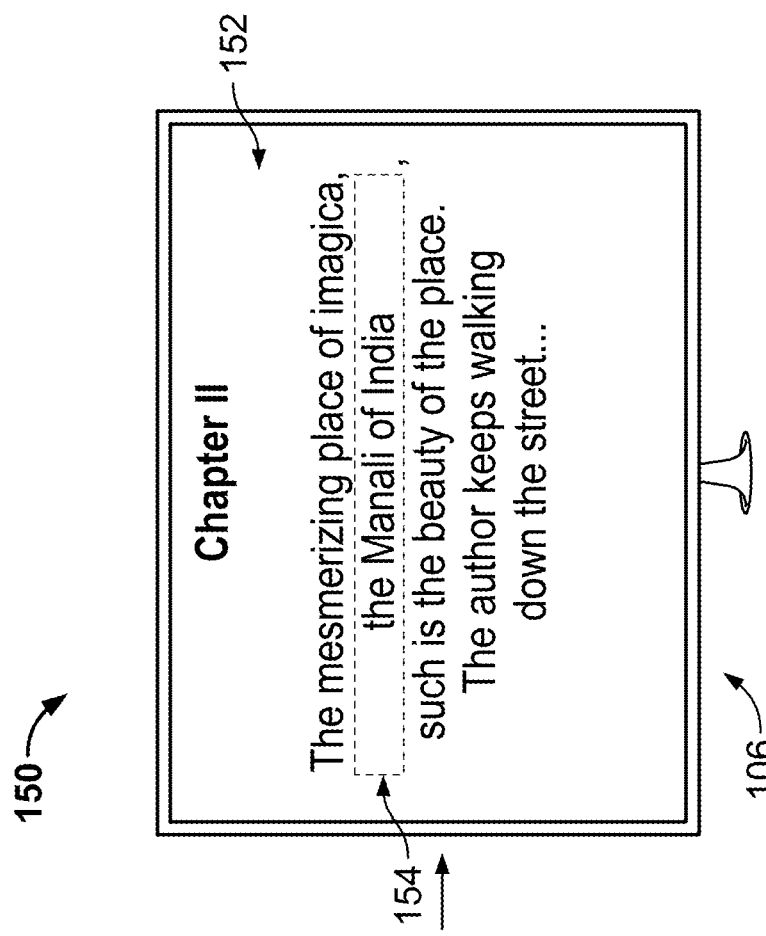
FIG. 1A and FIG. 1B show illustrative embodiments of a context assistance system converting a first entity in a content item to a second entity, in accordance with some embodiments of the present disclosure.
Figure 1B:
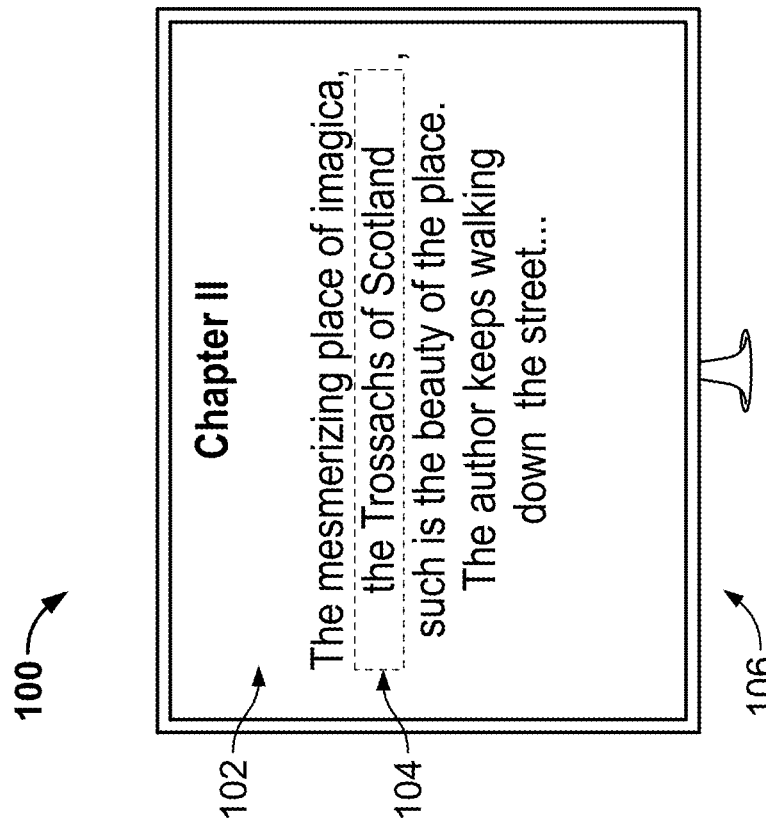

FIG. 1A and FIG. 1B show illustrative embodiments of a context assistance system converting a first entity 104 in a content item 102 to a second entity 154 based on a context associated with the content item in accordance with some embodiments of the present disclosure. The context assistance system may operate through control circuitry 404, as well be described in detail in the description of FIGS. 4 and 5.

As referred to herein, the term "content item" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

As referred to herein the term, "entity" should be understood to mean a reference, such as a word, phrase, or idea which comes from a source of information that is used to refer to specific names of people, places, or things. Non-limiting examples of references may include characters, people, objects, events, stories, quotes, personalities, places, things, or any suitable subject presented in a content item, or any suitable combination thereof.

As referred to herein the term, "context" should be understood to include culture, language, region, religion, cuisine, anecdotes, social habits, music, and arts, or any suitable subject that is specific to a particular group of people. The context encompasses any characteristics and knowledge of a particular group of people.

Content item instantiation 100 shows a portion of a content item (e.g., electronic book) 102 presented on a user device 106 in response to receiving a request for content item 102. Content item 102 in FIG. 1A describes a text for chapter II of a particular book in the English language. In some embodiments, a content item that is associated with a particular context may include an entity to a particular culture or language (e.g., a reference).

For example, content item instantiation 100 shows first entity 104 (e.g., the Trossachs of Scotland) to a particular culture of language (e.g., Scottish culture or English language) as a reference. The "Trossachs" is a Scottish Natural Heritage that is located in the southern part of Scotland. The Scottish users may not have a problem understanding the reference that is made in content item 102. However, when content item 102 is translated into another language such as Hindi, users of translated content item 152 who may not have geographic knowledge of the "Trossachs" may not understand the reference that is made in content item 102, as the "Trossachs" may not be as widely known to people who are not familiar with the Scottish geography.

To enhance comprehension of translated content item 152 to users who are not familiar with a certain region or culture, the context assistant system may convert a source reference that is made in an original content item with a more familiarized target reference that is better suited for a translated content item and also widely known to a group of people who access the translated content item.

To convert first entity 104 that is referenced in content item 102 to an entity that is widely known to the users of translated content item 152, the context assistance system may access metadata of content item 102, which includes information about one or more entities referenced in content item 102. The context assistance system performs metadata extraction to extract entities included in content item 102. The metadata may be provided by a content item provider or the context assistance system, or a combination thereof. The metadata may be stored in a content item data source 518 of FIG. 5.

The contextual assistant system may determine at least one attribute of first entity 104. An attribute is a quality, feature, or characteristic associated with an entity. This can be achieved by accessing a knowledge graph or other sources of information that include entity information and corresponding attribute information. Each entity may be associated with one or more attributes and the related information may be stored in the knowledge graph.

Knowledge graphs and their features are described in greater detail in U.S. patent application Ser. No. 14/501,504, filed Sep. 30, 2014, U.S. patent application Ser. No. 14/500,309, filed Sep. 29, 30, 2014, and U.S. patent application Ser. No. 14/448,308, filed Jul. 31, 2014, which are hereby incorporated by reference herein in their entireties. Knowledge graph provides information about a multitude of entities and their relationships with other entities and associated attributes and may be derived from a corpus from a wide variety of sources. Knowledge graph is composed of nodes and edges which represent information about relationships between different entities and associated attributes. Although the depicted knowledge graph comprises nodes and edges, it is only an illustrative embodiment. Knowledge graph can comprise of other suitable modes of representation of relationships between different entities without departing from the scope of this invention. For example, knowledge graph may include databases, lists, and collections that represent objects and their associated relationships.

Knowledge graph may be stored using storage circuitry. Data structures such as linked lists, trees, graphs, buckets or arrays may be used to represent knowledge graph in storage circuitry and may be tagged with an identification to indicate a relationship of an entity and associated attributes. Knowledge graph may be stored locally on user equipment device or stored remotely and accessed through communications network. Knowledge graph may be stored entirely in one location or be split into sections, and each section stored at one of a plurality of locations. In some embodiments, knowledge graph may be generated dynamically upon request using content from of content source.

In some embodiments, the context assistance system may determine attributes from a third-party database, a content item provider, or any suitable content item information Internet repository. The context assistance system may search the Internet or an online encyclopedia over an Internet connection for references that are made in content item 102. The context assistance system may compile the information retrieved from the knowledge graph and any external information accessible over the Internet to determine attribute information of an entity.

In some embodiments, content item consumption is associated with a user profile. For example, the context assistant system maintains a history of a content item that a user accesses, which is stored in an account or a profile associated with the user. A user profile is associated with user preferences, user behavior records, user priorities, a user-created or user-defined property of a content item consumption experience, or any combination thereof.

In some embodiments, the context assistance system receives user preference information for a user requesting content item 102. The user preference information may include information about a particular context with which a user is familiar. For example, a user may be familiar with the Scottish geography or culture, and an entity referenced in a content item that is written in Hindi does not need to be converted into a Hindi reference even though the user may be reading an English version of the book. The user preference information may include the users' preferred language or culture and may show an indication of whether a source entity that is referenced in an original content item needs to be replaced or converted.

The context assistance system identifies a second context in which content item 102 is to be presented based on a user request or a user profile. In one embodiment, a second context includes the second language (e.g., Hindi) that is different from the first language (e.g., English). In an alternative embodiment, the second entity includes the second culture (e.g., Indian culture) that is different from the first culture (e.g., Scottish culture).

To determine a second entity that is representative of a first entity in second context, the context assistance system identifies a plurality of candidates 206, 208, 210 that share similar characteristics to the first entity 104. For example, the context assistance system determines second entity 210 based on the second context and on at least one attribute of the first entity.

Figure 2A:
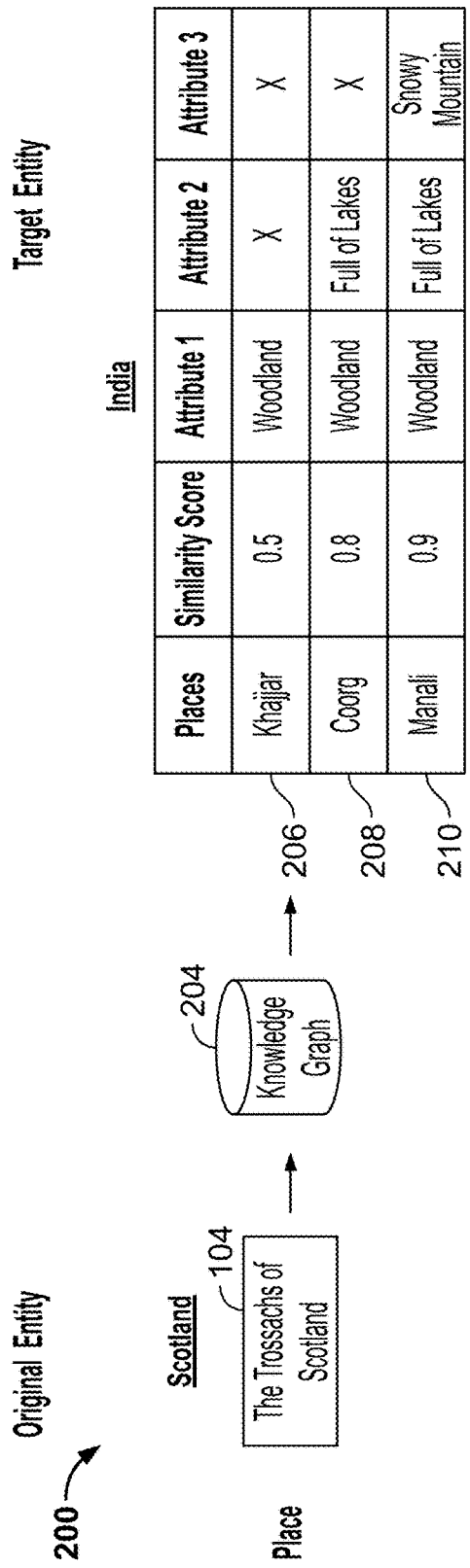
FIG. 2A and FIG. 2B show illustrative examples of the context assistance system identifying a target entity that is to be replaced with a source entity, in accordance with some embodiments of the disclosure.

FIG. 2A shows an illustrative embodiment 200 of identifying a second entity in accordance with some embodiments of the disclosure. The context assistance system may use the attribute information retrieved from the knowledge graph 204 to determine candidate entities 206, 208, 210 that are suitable for representing the first entity 104 in a second context. Each of the candidate entities 206, 208, 210 may include one or more matching attributes that are similar to the first entity 104. To determine whether each of the plurality of candidates shares similar characteristics, the context assistance system calculates a similarity score using the attribute information from the knowledge graph 204.

To calculate a similarity score, the context assistance system compares first entity 104 to each of the plurality of candidates 206, 208, 210. This is achieved by comparing at least one attribute of first entity 104 to a corresponding attribute of each of the plurality of candidates 206, 208, 210. For example, first entity 104 ("Trossachs") is associated with three attributes: 1) woodland, 2) full of lakes, and 3) snowy mountain, and attributes of first entity 104 is compared to each attribute of the plurality of candidates, "Khajjar" 206, "Coorg" 208, and "Mahali" 210.

Based on the matches between at least one attribute of the first entity and at least one attribute of each of the plurality of candidates, a similarity score is calculated. When more matching attributes exist between the first entity and a candidate entity, a similarity score may be calculated to be higher than other candidate entities that share a smaller number of matching attributes with the first entity. For example. "Khajjar" 206 has one matching attribute, and therefore, is determined to have the lowest similarity score (e.g., 0.5). On the other hand, "Mahali" 210 has three matching attributes, and therefore, is determined to have the highest similarity score (e.g., 0.9).

In some embodiments, the context assistance system determines a respective weight of an attribute based on the entity information. The weight of an attribute indicates a level of association of a respective attribute with a corresponding entity. For example, if the "Trossachs of Scotland" is known more as a woodland than a snowy mountain, then the woodland attribute is likely to be assigned a higher weight than the snowy mountain attribute. A similarity score may be calculated based on the determined corresponding weight. An attribute with a higher weight is likely to impact a similarity score more than an attribute with a lower weight. A corresponding weight may be assigned based on the compiled attribute information retrieved from the knowledge graph or any external information accessible over the Internet or a third-party provider.

In one embodiment, the context assistance system calculates a popularity score. A popularity score indicates a level of popularity of an entity in a particular context to a general audience. A popularity score may be calculated based on the compiled entity information retrieved from the knowledge graph or any external information accessible over the Internet or a third-party provider. A similarity score may be calculated based on a popularity score. If an attribute is widely known to the general audience, then the attribute is more likely to be selected than an attribute of the same similarity score that is less known.

The context assistance system calculates a similarity score for each candidate of the plurality of candidates 206, 208, 210 and selects second entity 210 from the plurality of candidates based on a respective similarity score. A candidate with a highest similarity score is likely to be selected as a second entity after considering a respective popularity score. For example, "Manali" 210 is selected as the second entity because "Manali" 210 has a score of 0.9, which is the highest than the score of each of the rest of the candidates, "Khajjar" 206 and "Coorg" 208 and also because it is more popular than the rest of candidates.

When a request to display translated content item 152 is received at the context assistant system, the context assistant system replaces reference to the first entity 104 ("The Trossachs of Scotland") in content item 102 with reference to the second entity 154 ("The Manali of India"). The second entity 154 is then merged with translated text (e.g., a Hindi version of chapter II of the book) of content item 152.

In FIG. 1B, content item instantiation 150 shows translated content item 152 with a replaced entity 154 (e.g., second entity) presented on user device 106. Content item 152 contains translated text and second entity 154 that is different from first entity 104. Thus, the "Manali of India" that is equivalent to the "Trossachs of Scotland" is displayed with translated content item 152. The translated content item 152 is shown in English for illustrative purposes but may actually be translated into the Hindi language.

In some embodiments, the language of content item 102 may remain the same in content item 152 of content item instantiation 150 if the determined second context is a location or culture context. If the first context is a UK culture and the second context is a US culture, an original language of content item 102 (e.g., English) may not be translated since the official language of the UK and the US are the same. Instead, certain references or subjects that are specific to the UK culture may be converted to US references or subjects.

Figure 2B:
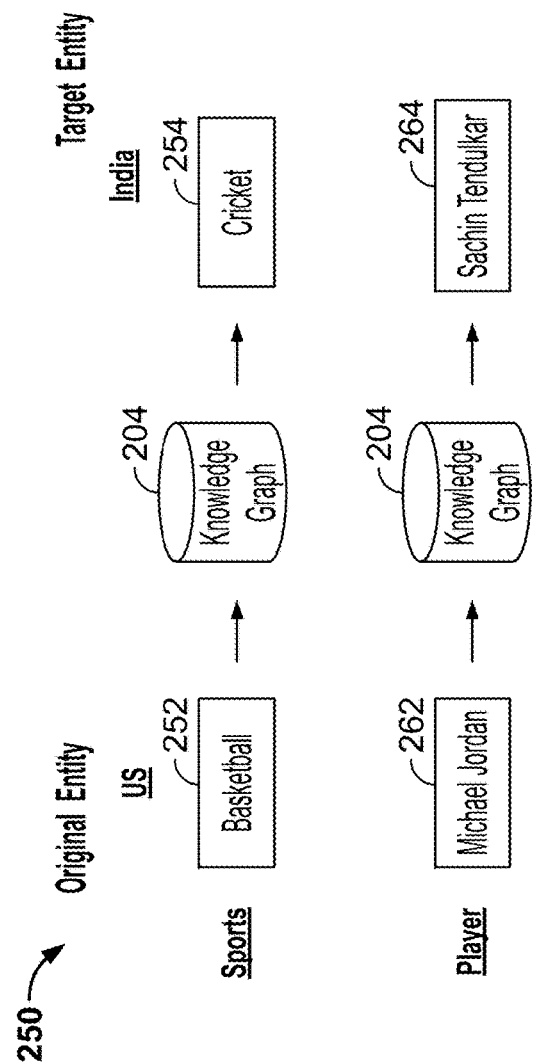

FIG. 2B shows another illustrative example 250 of identifying a second entity in accordance with some embodiments of the disclosure. Identifying a second entity may be performed for any entity type. For example, sports entity type "Basketball" 252 associated with the US region may be replaced with "Cricket" 254 associated with the Indian region if "Cricket" 254 is determined to be an equivalent sport to "Basketball" 252 in the US In a similar example, a sports player name entity, "Michael Jordan" 262, a famous basketball player in the US, may be replaced with "Sachin Tendulkar" 264, a famous Cricket player in India who had gained similar fame and success in the sports of Cricket.

Figure 3:
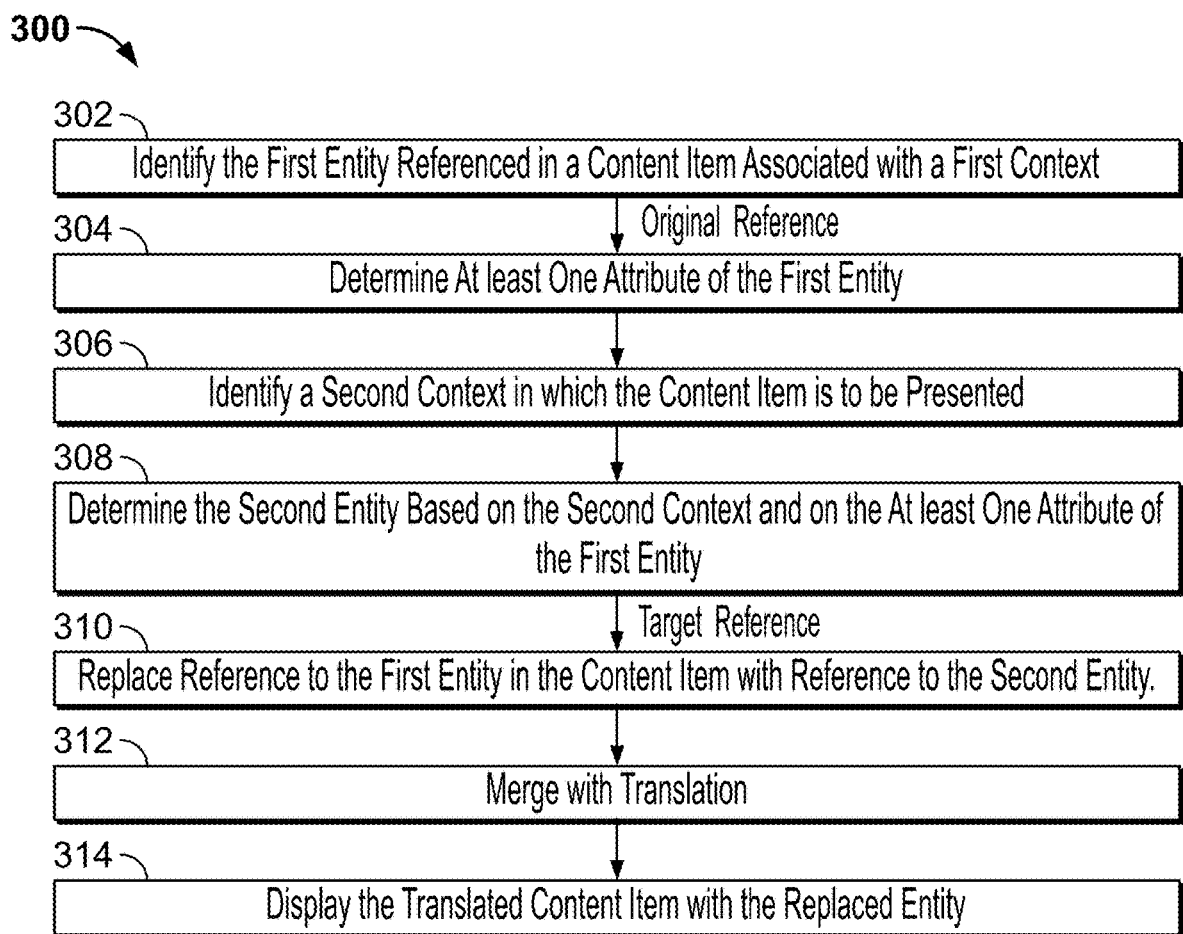
FIG. 3 shows an illustrative process for converting a source entity to a target entity, in accordance with some embodiments of the disclosure.

FIG. 3 shows an illustrative process 300 for providing translated content item 152 with a replaced entity 154 in accordance with some embodiments of the disclosure. It should be noted that processes 300 may be performed by control circuitry 404 of FIG. 4. Control circuitry 404 may be part of a device having a display 412 (e.g., a device that may have any or all of the functionality of user television or gaming equipment 502, user computer equipment 504, and/or wireless communications device 506 of FIG. 5), part of a remote server separated from the user equipment by way of a communication network (e.g., communication network 514 of FIG. 5), or may be distributed over a combination of both.

A process 300 may begin at block 302. At block 302, the context assistance system identifies first entity 104 that is referenced in a content item 102 associated with the first context. In some embodiments, the context assistance system applies, to the content item, image processing, text processing, audio processing, video processing, or a combination thereof. For example, the context assistance system may apply image processing or text processing to content item instantiation 100 to determine that first entity 104 contains references to the "Trossachs." The context assistance system may apply audio processing or video processing to a podcast or audio-visual files to identify spoken references to first entity 104. In some embodiments, the context assistance system receives information from a content item provider to identify a reference to a subject in the content item provider's content item. For example, the context assistance system analyzes closed captioning provided by the content provider when identifying whether a reference was made in the content item. In some embodiments, the context assistance system filters out local references specific to a particular country or region from content item 102. The local references may be filtered out based on compiled entity information retrieved from the knowledge graph or any external information accessible over the Internet or a third-party provider.

At block 304, control circuitry 404 determines at least one attribute of first entity 104. The context assistance system may access the knowledge graph or external information to identify one or more attributes that are associated with first entity 104. An attribute may be a particular characteristic or quality that distinguishes an entity from other entities.

At block 306, control circuitry 404 determines a second context in which content item 102 is to be presented. The context assistance system may access a user profile or a user request for display and language preferences. For example, the request or the user profile includes a user's preferred language into which content item 102 is to be translated. In some embodiments, the second context is associated with a selected language in which content item is to be displayed.

At block 308, control circuitry 404 determines second entity 154 based on the second context and on at least one attribute of the first entity. The context assistance system may calculate a similarity score to determine second entity 154 that is associated with the second context. The similarity score may be calculated based on matching attributes between the first entity and each of the candidate entities. In some embodiments, different weights may be assigned to a corresponding attribute based on the importance of the corresponding attribute in representing an entity. Based on the similarity score, the context assistance system selects the second entity from a plurality of candidates that share similar characteristics and qualities with the first entity.

At block 310, control circuitry 404 replaces reference to first entity 104 in the content item with second entity 154. In response to receiving a request to display content item 102 in a different language, the context assistance system replaces first entity 104 with second entity 154.

At block 312, control circuitry 404 combines the replaced entity with translated text of content item 102, merging the second entity (e.g., replaced entity) with translated content item 152.

At block 314, control circuitry causes translated content item 152 to be displayed on user device 106. For example, translated content item 152 may include a translated text of chapter II in Indian which includes a replaced reference, the "Manali of India" instead of the "Trossachs of Scotland." In some embodiments, the translated content item 152 is caused to be displayed with closed captions or subtitles that include second entity 154.

Figure 4:
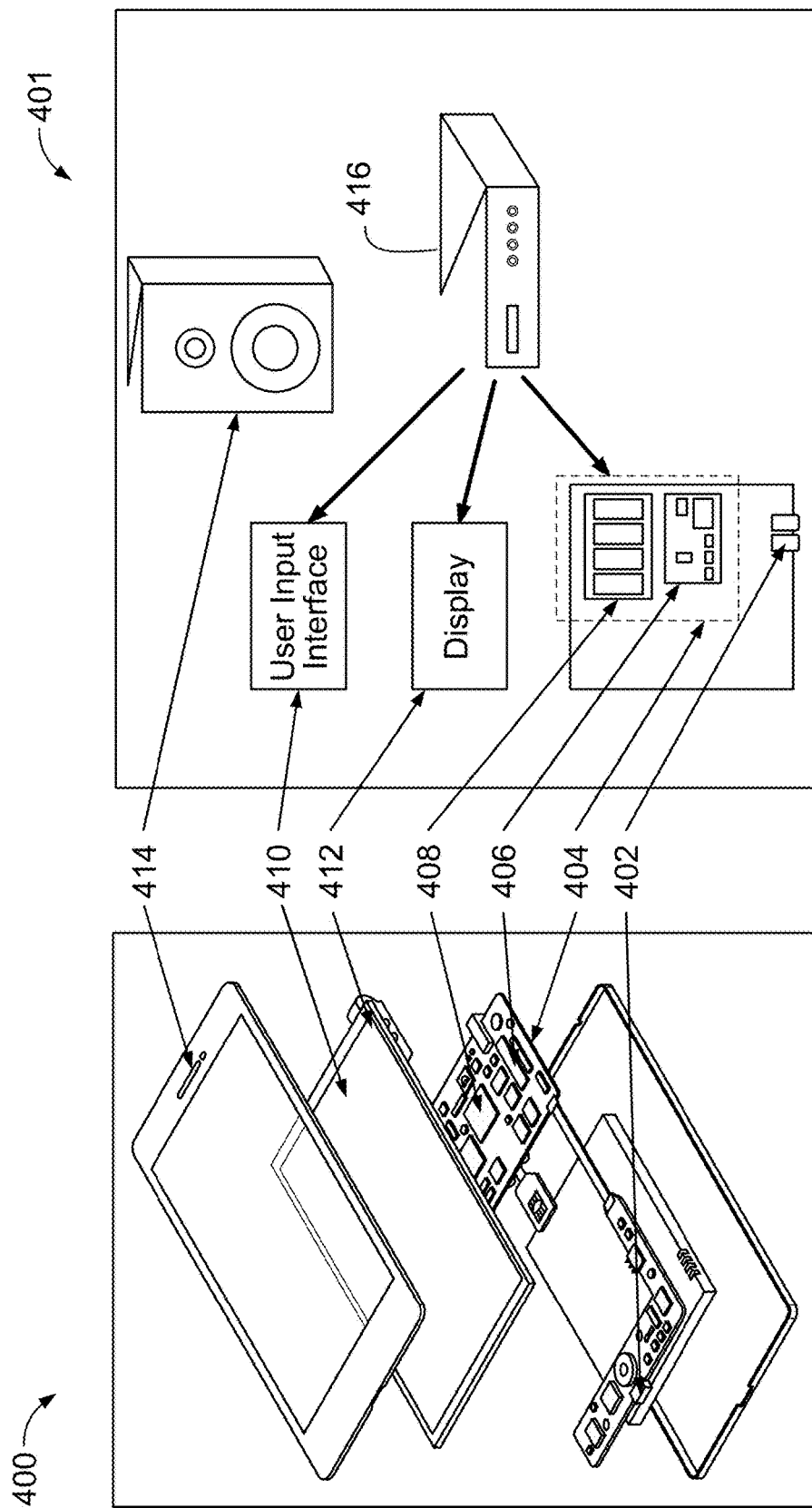
FIG. 4 shows a block diagram of an illustrative device, in accordance with some embodiments of the disclosure.

FIG. 4 shows generalized embodiments of a device capable of presenting content items on a display 412. For example, display 412 may belong to a smartphone device. In another example, display 412 may belong to a user television, gaming equipment system, or electronic book reader device. User television or gaming equipment system, or electronic book reader device with display 412 may include a set-top box 416. Set-top box 416 may be communicatively connected to speaker 414, and display 412. In some embodiments, display 412 may be a television display or a computer display. In some embodiments, set top box 416 may be communicatively connected to user interface input 410. In some embodiments, user interface input 410 may be a remote-control device. Set-top box 416 may include one or more circuit boards. In some embodiments, the circuit boards may include processing circuitry, control circuitry, and storage (e.g., RAM, ROM, Hard Disk, or Removable Disk). In some embodiments, circuit boards may include an input/output path. More specific implementations of devices are discussed below in connection with FIG. 5. Each one of device 400 and user equipment system 401 may receive content items and data via input/output (hereinafter "I/O") path 402. I/O path 402 may provide content items (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. In some implementations, any action performed by control circuitry 404 may be based on instructions received from the application.

In client-server based embodiments, control circuitry 404 may include communications circuitry suitable for communicating with a context assistance system server or other networks or servers. The instructions for carrying out the above-mentioned functionality may be stored on the context assistance system server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of devices, or communication of devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein, including, for example, a user profile associated with content item consumption, user preferences for providing translated content item, language information, contextual information about a content item, and weights associated with associations between subjects. Nonvolatile memory may also be used (e.g., to launch a boot-up routine and other instructions). Cloud-based storage, described in relation to FIG. 5, may be used to supplement storage 408 or instead of storage 408. In some embodiments, a database is accessible at the cloud-based storage, where the database stores a user profile associated with content item consumption, user preferences for displaying a content item in various languages, contextual information about a content item, and weights associated with entities. Nonvolatile memory may also be used (e.g., to launch a boot-up routine and other instructions).

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content items into the preferred output format of the user equipment 400. Circuitry 404 may also include digital-to-analog converter circuitry and analog-to-digital converter circuitry for converting between digital and analog signals. The tuning and encoding circuitry may be used by the device to receive and to display, to play, or to record content items. The tuning and encoding circuitry may also be used to receive content item data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, or multiple-tuner recording). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of device 400 and user equipment system 401. For example, display 412 may be a touchscreen or touch-sensitive display. In such circumstances, user input interface 410 may be integrated with or combined with display 412. Display 412 may be one or more of a monitor, a television, a liquid crystal display (LC D) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive application and any suitable content item may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of each one of device 400 and user equipment system 401 or may be stand-alone units. The audio component of videos and other content items displayed on display 412 may be played through speakers 414. In some embodiments, the audio may be distributed to a receiver (not shown), which processes and outputs the audio via speakers 414.

The context assistance system may be implemented using any suitable architecture. For example, it may be a stand-alone application wholly-implemented on each one of device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410.

In some embodiments, the application is a client-server based application. Data for use by a thick or thin client implemented on each one of device 400 and user equipment system 401 is retrieved on-demand by issuing requests to a server remote to each one of device 400 and user equipment system 401. In one example of a client-server based context assistance system, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400.

In some embodiments, the context assistance system is downloaded and interpreted or otherwise run by an interpreter or virtual machine (run by control circuitry 404). In some embodiments, the context assistance system may be encoded in the ETV Binary Interchange Format (EBIF), received by control circuitry 404 as part of a suitable feed, and interpreted by a user agent running on control circuitry 404. For example, the context assistance system may be an EBIF application. In some embodiments, the context assistance system may be defined by a series of JAVA-based files that are received and run by a local virtual machine or other suitable middleware executed by control circuitry 404. In some of such embodiments (e.g., those employing MPEG-2 or other digital media encoding schemes), the context assistance system may be, for example, encoded and transmitted in an MPEG-2 object carousel with the MPEG audio and video packets of a program.

Figure 5:
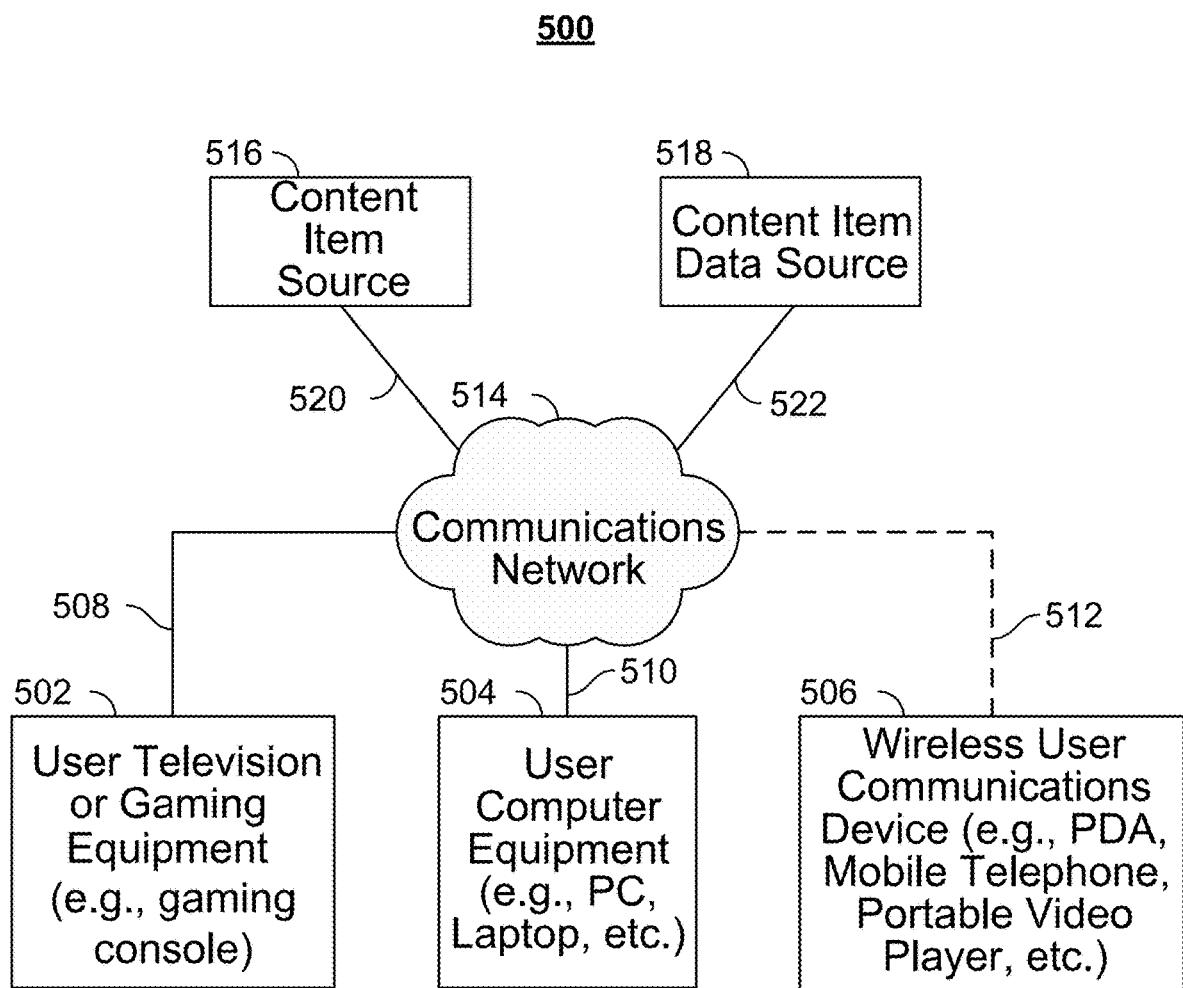
FIG. 5 shows a block diagram of an illustrative context assistance system, in accordance with some embodiments of the disclosure.

Each one of device 102, 202, 400 and user equipment system 401 of FIG. 4 may be implemented in system 500 of FIG. 5 as user television or gaming equipment 502, user computer equipment 504, wireless user communications device 506, or any other type of user equipment suitable for accessing content items, such as a non-portable gaming machine. For simplicity, these devices may be referred to herein collectively as user equipment or devices and may be substantially similar to devices described above. Devices, on which an application may be implemented, may function as a standalone device or may be part of a network of devices. Various network configurations of devices may be implemented and are discussed in more detail below.

A device utilizing at least some of the system features described above in connection with FIG. 4 may not be classified solely as user television, electronic book reader device, or gaming equipment 502, user computer equipment 504, or a wireless user communications device 506. For example, user television, electronic book reader device, or gaming equipment 502 may, like some user computer equipment 504, be Internet-enabled allowing for access to Internet content, while user computer equipment 504 may, like some television equipment 502, include a tuner allowing for access to television programming. The application may have the same layout on various different types of user equipment or may be tailored to the display capabilities of the user equipment. For example, on user computer equipment 504, the context assistance system may be provided as a web site accessed by a web browser. In another example, the context assistance system may be scaled down for wireless user communications devices 506.

In system 500, there is typically more than one of each type of device but only one of each is shown in FIG. 5 to avoid overcomplicating the drawing. In addition, each user may utilize more than one type of device and also more than one of each type of device.

The user may also set various settings to maintain consistent application settings across in-home devices and remote devices. For example, if a user changes his or her preference for how a context assistance system displays the content on a publicly accessible personal computer in a library, this feature would also be enabled on the user's in-home devices (e.g., user television or gaming equipment and user computer equipment) as well as the user's mobile devices, if desired. Therefore, changes made on one device may change the content item consumption experienced on another device, regardless of whether they are the same or a different type of device. In addition, the changes made may be based on settings input by a user, as well as user activity monitored by the context assistance system. In addition, two devices may work together to provide functionality for the user. For example, a first device changing the user preference for what contextual information is displayed in a reminder may further instruct a second device to perform a similar change if the second device is also associated with the user profile containing the user preference.

The devices may be coupled to communications network 514. Namely, user television or gaming equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the devices may be provided by one or more of these communications paths but are shown as a single path in FIG. 5 to avoid overcomplicating the drawing.

Although communications paths are not drawn between devices, these devices may communicate directly with each other via communications paths, such as those described above in connection with paths 508, 510, and 512, as well as other short-range point-to-point communications paths, such as USB cables, IEEE 1394 cables, wireless paths (e.g., Bluetooth, infrared, or IEEE 502-11x), or other short-range communication via wired or wireless paths. BLUETOOTH is a certification mark owned by Bluetooth SIG, INC. The devices may also communicate with each other directly through an indirect path via communications network 514.

System 500 includes content item source 516 and content item data source 518 coupled to communications network 514 via communications paths 520 and 522, respectively. Paths 520 and 522 may include any of the communications paths described above in connection with paths 508, 510, and 512. Communications with the content item source 516 and content item data source 518 may be exchanged over one or more communications paths but are shown as a single path in FIG. 5 to avoid overcomplicating the drawing. In addition, there may be more than one of each of content item source 516 and content item data source 518, but only one of each is shown in FIG. 5 to avoid overcomplicating the drawing. If desired, content item source 516 and content item data source 518 may be integrated as one source device. Although communications between sources 516 and 518 with devices 502, 504, and 506 are shown as through communications network 514, in some embodiments, sources 516 and 518 may communicate directly with devices 502, 504, and 506 via communications paths (not shown) such as those described above in connection with paths 508, 510, and 512.

Content item source 516 may include one or more types of content item distribution equipment including a television distribution facility, cable system headend, satellite distribution facility, programming sources (e.g., television broadcasters), podcast distribution facility, publication facility, intermediate distribution facilities and/or servers, Internet providers, on-demand content item servers, and other content item providers. Content item source 516 may be the originator of content items (e.g., a television broadcaster, a Webcast provider, a printed book provider) or may not be the originator of content items (e.g., an on-demand content item provider, electronic book provider, or an Internet provider of content items of broadcast programs for downloading). Content item source 516 may include cable sources, satellite providers, on-demand providers, Internet providers, publishers, over-the-top content item providers, or other providers of content items. Content item source 516 may also include a remote content item server used to store different types of content (including video or textual content items selected by a user), in a location remote from any of the devices. Content item source 516 may include at least two sources for content items that provide content items for the context assistance system to provide on the devices (e.g., devices 102 and 202). Systems and methods for remote storage of content items and providing remotely stored content items to user equipment are discussed in greater detail in connection with Ellis et al., U.S. Pat. No. 7,761,892, issued Jul. 20, 2010, which is hereby incorporated by reference herein in its entirety.

Content item data source 518 may provide data related to the content items. Content item data may be provided to the devices using any suitable approach. In some embodiments, the context assistance system may be a stand-alone interactive content guide that receives content guide data via a data feed (e.g., a continuous feed or trickle feed).

In some embodiments, content item data from content item data source 518 may be provided to user's equipment using a client-server approach. For example, a user equipment device may pull content item data from a server, or a server may push content item data to a user equipment device. In some embodiments, a context assistance system client residing on the user's equipment may initiate sessions with source 518 to obtain content item data when needed, e.g., when the content item data is out of date or when the device requests the data. Content item data may be provided to the user equipment with any suitable frequency (e.g., continuously, daily, a user-specified period of time, a system-specified period of time, or in response to a request from user equipment). Content item data source 518 may provide devices 502, 504, and 506 the application itself or software updates for the application.

In some embodiments, the content item data may include viewer data. For example, the viewer data may include current and/or historical user activity information (e.g., what content items the user typically watches or reads, in what language the user watches or reads content items, whether the user interacts with a social network, at what times the user interacts with a social network to post information, what types of content items the user typically watches or reads (e.g., pay content item or free content item), mood, or brain activity information). The content item data may also include subscription data. For example, the subscription data may identify to which sources or services a given user subscribes and/or to which sources or services the given user has previously subscribed but later terminated access (e.g., whether the user subscribes to premium channels or books, whether the user has added a premium level of services, whether the user has increased Internet speed). In some embodiments, the viewer data and/or the subscription data may identify patterns of a given user for a period of less or more than one year. The content item data may include a model (e.g., a survivor model) used for generating a score that indicates a likelihood a given user will terminate access to a service/source. For example, the application may monitor a user's engagement with content items to generate a value or score that indicates a likelihood of whether the given user will terminate access to a particular service or source. In particular, a higher score may indicate a higher level of confidence that the user will terminate access to a particular service or source. Based on the score, the application may generate promotions that entice the user to keep the particular service or source indicated by the score as one to which the user will likely terminate access. The content item data may include metadata files pertaining to the content item or content item segments (e.g., entities referenced in content item portions, language information about the segments of the content items). The content item data may also include user profiles used to determine likelihoods of the user reading or watching the content item in what language.

Applications may be, for example, stand-alone applications implemented on devices. For example, the application may be implemented as software or a set of executable instructions which may be stored in storage 408 and executed by control circuitry 404 of each one of device 400 and user equipment system 401. In some embodiments, applications may be client-server applications where only a client application resides on the device, and server application resides on a remote server. For example, applications may be implemented partially as a client application on control circuitry 404 of each one of device 400 and user equipment system 401 and partially on a remote server as a server application (e.g., content item data source 518) running on control circuitry of the remote server. When executed by control circuitry of the remote server (such as content item data source 518), the application may instruct the control circuitry to generate the content item displays and transmit the generated displays to the devices. The server application may instruct the control circuitry of the content item data source 518 to transmit data for storage on the device. The client application may instruct control circuitry of the receiving user equipment to generate the content item displays.

Content and/or content item data delivered to devices 502, 504, and 506 may be OTT content or streaming content items. OTT content item delivery allows Internet-enabled devices, including any device described above, to receive content that is transferred over the Internet, including any content described above, in addition to content received over cable or satellite connections. OTT content is delivered via an Internet connection provided by an Internet service provider (ISP), but a third party distributes the content items. The ISP may not be responsible for the viewing abilities, copyrights, or redistribution of the content, and may only transfer IP packets provided by the OTT content item provider. Examples of OTT content item providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content item providers may additionally or alternatively provide content item data described above.

Content item output system 500 is intended to illustrate a number of approaches, or network configurations, by which devices and sources of content and content item data may communicate with each other for the purpose of synchronizing metadata generated that is associated with a user profile and displaying similar reminders based on the synchronized metadata. The embodiments described herein may be applied in any one or a subset of these approaches, or in a system employing other approaches for delivering content items. The following four approaches provide specific illustrations of the generalized example of FIG. 5.

In one approach, devices may communicate with each other within a home network. Devices may communicate with each other directly via short-range point-to-point communication schemes described above, via indirect paths through a hub or other similar device provided on a home network, or via communications network 514. Each of the multiple individuals in a single home may operate different devices on the home network. As a result, it may be desirable for various context assistance system information or settings to be communicated between the different devices. For example, it may be desirable for users to maintain consistent application settings on different devices within a home network, as described in greater detail in Ellis et al., US Patent Publication No. 2005/0251827, filed Jul. 11, 2005. Different types of devices in a home network may also communicate with each other to transmit content items.

In a second approach, users may have multiple types of user equipment by which they access content items. For example, some users may have home networks that are accessed by in-home and mobile devices. Users may control in-home devices via an application implemented on a remote device. For example, users may access an online application on a website via a personal computer at their office, or a mobile device such as a PDA or web-enabled mobile telephone. The user may set various settings (e.g., recordings, reminders, content item segment buffering enablement, or other settings) on the online context assistance system to control the user's in-home equipment. The online application may control the user's equipment directly, or by communicating with an application on the user's in-home equipment. Various systems and methods for devices communicating, where the devices are in locations remote from each other, is discussed in, for example, Ellis et al., U.S. Pat. No. 8,046,801, issued Oct. 25, 2011, which is hereby incorporated by reference herein in its entirety.

In a third approach, users of devices inside and outside a home may use their application to communicate directly with content item source 516 to access content items. Specifically, within a home, users of user television or gaming equipment 502 and user computer equipment 504 may access the application to navigate among and locate desirable content items. Users may also access the application outside of the home using wireless user communications devices 506 to navigate among and locate desirable content items.

In a fourth approach, devices may operate in a cloud computing environment to access cloud services. In a cloud computing environment, various types of computing services for content item sharing, storage or distribution (e.g., video sharing sites or social networking sites) are provided by a collection of network-accessible computing and storage resources, referred to as "the cloud." For example, the cloud may include a collection of server computing devices, which may be located centrally or at distributed locations, that provide cloud-based services to various types of users and devices connected via a network such as the Internet via communications network 514. These cloud resources may include one or more content item sources 516 and one or more content item data sources 518. In addition or in the alternative, the remote computing sites may include other devices, such as user television or gaming equipment 502, user computer equipment 504, and wireless user communications device 506. For example, the other devices may provide access to a stored copy of a video or a streamed video. In such embodiments, devices may operate in a peer-to-peer manner without communicating with a central server.

The cloud provides access to services, such as content item storage, content item sharing, or social networking services, among other examples, as well as access to any content items described above, for devices. Services may be provided in the cloud through cloud computing service providers, or through other providers of online services. For example, the cloud-based services may include a content item storage service, a content item sharing site, a social networking site, or other services via which a user-sourced content item is distributed for viewing by others on connected devices. These cloud-based services may allow a device to store content items to the cloud and to receive content items from the cloud rather than storing content items locally and accessing locally-stored content items.

Cloud resources may be accessed by a device using, for example, a web browser, an application, a desktop application, a mobile application, and/or any combination of access applications of the same. The device may be a cloud client that relies on cloud computing for application delivery, or the device may have some functionality without access to cloud resources. For example, some applications running on the device may be cloud applications, i.e., applications delivered as a service over the Internet, while other applications may be stored and run on the device. In some embodiments, a device may receive content items from multiple cloud resources simultaneously. For example, a device may stream audio from one cloud resource while downloading content items from a second cloud resource. Or a device may download content items from multiple cloud resources for more efficient downloading. In some embodiments, devices may use cloud resources for processing operations such as the processing operations performed by processing circuitry described in relation to FIG. 4.

Any one or more of device 400 and user equipment system 401 of FIG. 4 and user television, electronic book reader device, or gaming equipment 502, user computer equipment 504, and wireless user communications device 506 of FIG. 5 may be used to provide a thorough and efficient content item consumption experience. For example, the context assistance systems, associated with devices, of the present disclosure may cause to be provided contextual information for reminding a content item consumer of associations among subjects previously referenced in a content item. Further details of the present disclosure are discussed below in connection with the flowcharts of FIGS. 3A-3B.

What is claimed is:

1. A computer-implemented method for converting a first entity to a second entity, the method comprising:
  receiving, at a user device during output of a content item, a request to display a translation of the content item, the content item comprising a plurality of ordered portions wherein a first portion of the content item is scheduled for output before a last portion of the content item is received; and
  in response to receiving the request:
  identifying, using control circuitry of the user device, the first entity referenced in a next portion of the content item scheduled for output, the first entity associated with a first context;
  determining, using the control circuitry, at least one attribute of the first entity, wherein the at least one attribute describes a characteristic of the first entity;
  identifying, using the control circuitry, a second context in which the content item is to be presented by an output device of the user device;
  determining, using the control circuitry, the second entity based on the second context and on the at least one attribute of the first entity by:
  retrieving, by the user device from a remote storage via a communications network, a knowledge graph stored in the remote storage, wherein a data structure of the knowledge graph comprises a plurality of entities and corresponding respective attribute information, the attribute information comprising the at least one attribute of the first entity;
  based on the attribute information, identifying a plurality of candidates for the second entity included in the data structure of the knowledge graph;
  calculating a respective similarity score for each of the plurality of candidates included in the data structure of the knowledge graph; and
  selecting the second entity from the plurality of candidates stored in the data structure of the knowledge graph based on the respective similarity score;
  prior to output of the first entity, by the output device of the user device, replacing reference to the first entity in the content item with reference to the second entity; and
  generating for output, by the output device of the user device, the second entity in place of the first entity.

2. The method of claim 1, further comprising:
  receiving a request for the content item; and
  receiving user preference information for a user requesting the content item, wherein identifying the second context is based on the user preference information.

3. The method of claim 1, wherein calculating the respective similarity score comprises:
  for each candidate of the plurality of candidates, comparing the at least one attribute of the first entity to a corresponding at least one attribute of each of the plurality of candidates; and
  determining, based on the comparing, whether the at least one attribute of the first entity matches the at least one attribute of each of the plurality of candidates; and
  wherein the respective similarity score is calculated based on matches between the at least one attribute of the first entity and the at least one attribute of each of the plurality of candidates.

4. The method of claim 1, wherein calculating the respective similarity score comprises:
  for each of the plurality of candidates, calculating a respective popularity score indicating a level of popularity based on entity information; and
  wherein the respective similarity score is calculated based on the respective popularity score.

5. The method of claim 1, wherein calculating the respective similarity score comprises:
  for each of the plurality of candidates, determining a respective weight indicating a level of association of a respective attribute with a respective entity based on the entity information; and
  wherein the respective similarity score is calculated based on the determined weight.

6. The method of claim 1, wherein identifying the first entity referenced in the content item is based on metadata associated with the content item.

7. The method of claim 1, wherein the second context comprises a second language and the first context comprises a first language.

8. The method of claim 1, wherein the second context comprises a second culture and the first context comprises a first culture.

9. The method of claim 1, wherein the second entity is representative of the first entity in the second context.

10. A system for providing a content recommendation, the system comprising:
  input/output (I/O) interface circuitry configured to receive, at a user device during output of a content item, a request to display a translation of the content item, the content item comprising a plurality of ordered portions wherein a first portion of the content item is scheduled for output before a last portion of the content item is received; and
  processing circuitry configured to, in response to receiving the request:
  identify a first entity referenced in a next portion of the content item scheduled for output, the first entity associated with a first context;
  determine at least one attribute of the first entity, wherein the at least one attribute describes a characteristic of the first entity;
  identify a second context in which the content item is to be presented by an output device of the user device;
  retrieve, by the user device from a remote storage via a communications network, a knowledge graph stored in the remote storage, wherein a data structure of the knowledge graph comprises a plurality of entities and corresponding respective attribute information, the attribute information comprising the at least one attribute of the first entity;
  based on the attribute information, identify a plurality of candidates for a second entity included in the data structure of the knowledge graph;
  calculate a respective similarity score for each of the plurality of candidates included in the data structure of the knowledge graph; and select the second entity from the plurality of candidates stored in the data structure of the knowledge graph based on the respective similarity score;

prior to output of the first entity, by the output device of the user device, replace reference to the first entity in the content item with reference to the second entity; and generate for output by the output device of the user device, the second entity in place of the first entity.

11. The system of claim 10, wherein the processing circuitry is further configured to:

receive a request for the content item; and receive user preference information for a user requesting the content item, wherein identifying the second context is based on the user preference information.

12. The system of claim 10, wherein the processing circuitry, when calculating the respective similarity score, is configured to:

for each candidate of the plurality of candidates, compare the at least one attribute of the first entity to a corresponding at least one attribute of each of the plurality of candidates; and determine, based on the comparing, whether the at least one attribute of the first entity matches the at least one attribute of each of the plurality of candidates; and wherein the respective similarity score is calculated based on matches between the at least one attribute of the first entity and the at least one attribute of each of the plurality of candidates.

13. The system of claim 10, wherein the processing circuitry, when calculating the respective similarity score, is configured to:

for each of the plurality of candidates, calculate a respective popularity score indicating a level of popularity based on entity information; and wherein the respective similarity score is calculated based on the respective popularity score.

14. The system of claim 10, wherein the processing circuitry, when calculating the respective similarity score, is configured to:

for each of the plurality of candidates, determine a respective weight indicating a level of association of a respective attribute with a respective entity based on the entity information; and wherein the respective similarity score is calculated based on the determined weight.

15. The system of claim 10, wherein identifying the first entity referenced in the content item is based on metadata associated with the content item.

16. The system of claim 10, wherein the second context comprises a second language and the first context comprises a first language.

17. The system of claim 10, wherein the second context comprises a second culture and the first context comprises a first culture.

18. The system of claim 10, wherein the second entity is representative of the first entity in the second context.

* * * * *